Patented Jan. 24, 1928.

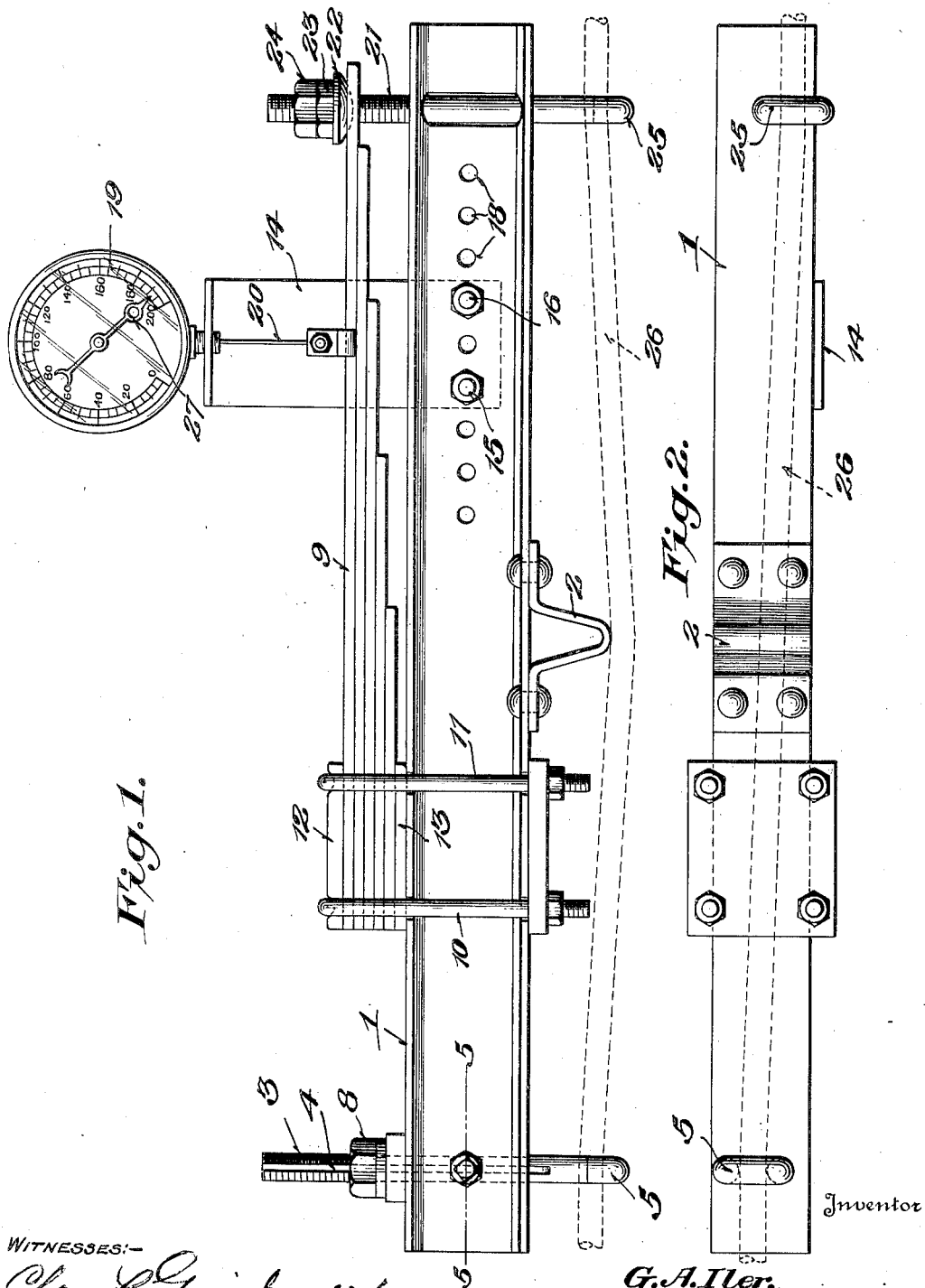

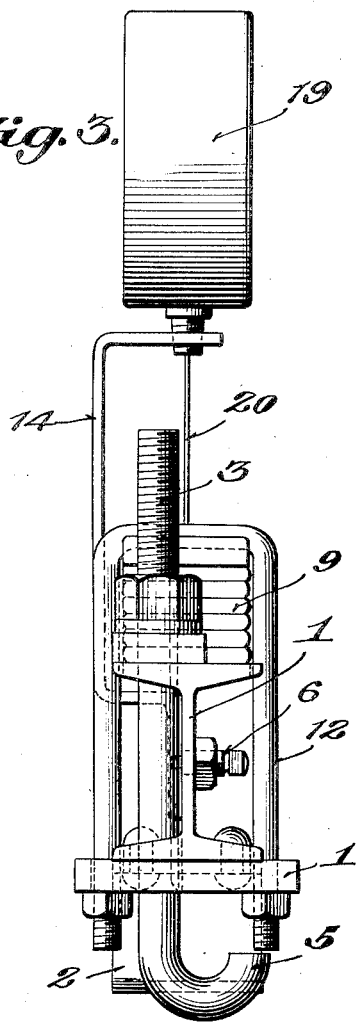
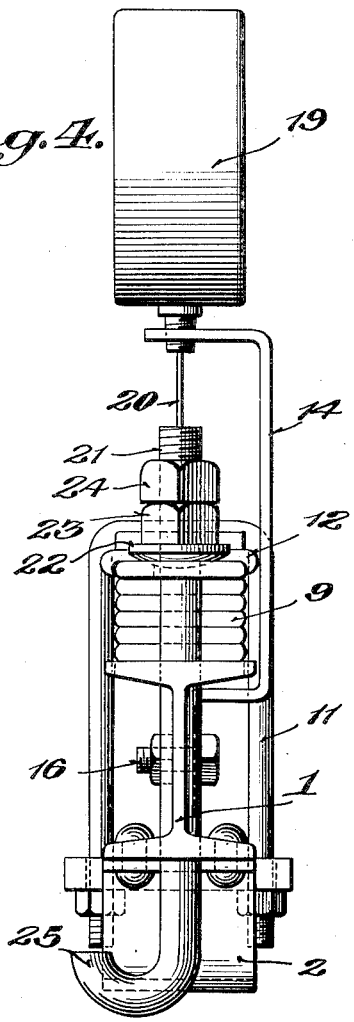

1,657,261

UNITED STATES PATENT OFFICE.

GEORGE ARTHUR ILER, OF YOUNGSTOWN, OHIO.

TENSIOMETER.

Application filed August 4, 1926. Serial No. 127,129.

This invention relates to tensiometer and more particularly to an instrument which will be used for testing the tension of transmission line wires, guy and bracing wires, and the like, so that under or over tensioning of the wires may be prevented.

An object of the invention is to provide a tensiometer with a body having a permanently fixed fulcrum joint on which the wire being tested will bear, and a pair of adjustable wire engaging hooks or members disposed at opposite sides of said fulcrum joint adjacent the ends of said beam.

A further object of the invention is to provide a tensiometer with an I-beam body, on which a portion of a leaf spring is supported for connection with a gauge, so that the tension of a wire may be ascertained, when the same is placed over the fixed fulcrum at the center of the beam, and engaged by the adjustable wire engaging fingers or means adjacent the ends of said beam.

A still further object of the invention is to provide a tensiometer which will be rugged and durable in construction, and highly efficient in use.

Other objects will appear as the description proceeds.

In the accompanying drawings which form part of my application,

Figure 1 is a side elevation of my improved tensiometer;

Figure 2 is a bottom plan view of the tensiometer;

Figure 3 is an end view of the apparatus looking from the left of Figure 1 of the drawings;

Figure 4 is an end view of the apparatus looking from the right of Figure 1 of the drawings, and Figure 5 is a sectional view taken on the line 5—5 of Figure 1.

Like characters of reference are used throughout the following specification and the accompanying drawings to designate corresponding parts.

The improved tensiometer comprises a body 1 preferably of an I-beam formation and has a V-shape fulcrum 2 fixedly attached on its lower surface adjacent its central point.

Alined openings are formed through the flanges of the body 1 adjacent one end thereof, and are adapted to adjustably receive a threaded bolt 3, the same being provided with a vertically extending slot 4, and at its lower end with an integrally formed wire engaging hook or member 5. A threaded bolt 6 extends transversely through the web of the I-beam 1, and is reduced at its inner end at 7. The reduced inner end 7 is adapted to seat in the slot 4 in the bolt 3, and serves as a guide for the same, and also prevents rotation of the bolt. By rotating the nut 8 on the bolt 3, the hook 5 on its lower end may be adjusted towards or away from the lower surface of the body 1.

A leaf spring 9 consisting of a plurality of leaves is secured to the upper flange of the body 1, and is held thereon by the spring clips 10 and 11. Retaining plates 12 and 13 are positioned at the opposite sides of the spring leaves to aid in holding the spring in rigid position. The opposite edges of the flanges are also slightly notched to receive the clips 10 and 11.

A bracket member 14 is secured adjacent the opposite end of the body 1, by means of the bolts 15 and 16, and is longitudinally adjustable on said body, the said holding bolts being adapted to be fastened through any desired alternate pair of the plurality of openings 18 through the web of the body. A suitable tension gauge 19 is removably secured at the free end of the bracket 14 and is operatively connected to the upper leaf of the spring 9, through the medium of the wire 20.

A second bolt 21 extends freely and slidably through the web and spaced flanges of the I-beam 1 near the end of the said beam adjacent the tension gauge 19, and is connected with the outer end of the upper leaf of the spring 9, by means of the washer 22 and bolts 23 and 24. The lower end of the bolt 21 terminates in a hook 25 which is adapted to engage and hold a wire or cable when its tensile strength or stress is being tested.

From the foregoing description, it will be seen that the mode of operation will be as follows:—The nut 8 on bolt 3 is backed off a considerable distance and the tensiometer is placed so that the wire 26 being tested will extend over and contact with the fulcrum 2. The wire gripping hooks or members 5 and 25 will then be engaged by the wire 26 and the nut 8 again tightened down so that the wire 26 will be placed under tension. By tightening the nut 8 down, the spring 9 will be caused to flex towards the upper flange of the I-beam 1, which movement, in turn causes the wire 20 attached to the gauge 19 to operate the pointer or indicator 27 on the said gauge to indicate the strain on the cable or wire 26.

In this manner, an accurate test may be made to determine the tension on a guy wire or transmission line, or other wire, so that the wire will not be over-tensioned and subject to breakage.

It will be obvious, that the hereinbefore described apparatus will be extremely durable and positive and accurate in operation.

The fulcrum being in or adjacent the center of the body 1, prevents undue strain being placed on the I-beam, and also the fact that the fulcrum 2 is fixed to the I-beam, positively prevents any error in calculation of tension due to wear or inaccurate positioning of the fulcrum. As illustrated in the drawings, the wire engaging means are arranged at opposite sides of a central longitudinal line through the body.

It will be understood that many minor changes in detail of construction may be resorted to without departure from the spirit of the invention.

I claim:

1. A tensiometer comprising a rigid body, adjustable wire engaging means adjacent the ends of said body, and a fixed fulcrum interposed between said wire engaging means.

2. A tensiometer comprising a rigid body, a fixed fulcrum adjacent the center of said body, wire engaging means at the extremities of said body, means for adjustably and yieldingly supporting the wire engaging means at one extremity of the body and a gauge operatively connected to the adjustably and yieldingly mounted wire engaging means.

3. A tensiometer comprising a rigid body, a fixed fulcrum adjacent the center of said body, wire engaging means at the extremities of said body, a spring on said body interposed between said wire engaging means, and a gauge operatively connected with said spring.

4. A tensiometer comprising a rigid body, a fixed fulcrum adjacent the center of said body, wire engaging means at the extremities of said body, a spring on said body interposed between one of said wire engaging means and said fixed fulcrum, and said spring being connected with said other wire engaging means, and a gauge operatively connected with said spring.

5. A tensiometer comprising a rigid body, a fixed fulcrum adjacent the center of said body, wire engaging means at the extremities of said body, a spring on said body interposed between one of said wire engaging means and said fixed fulcrum, a gauge operatively connected between said spring and body, and said gauge being adjustable with respect to said body.

6. A tensiometer comprising a rigid body, a fixed fulcrum intermediate the ends thereof, wire engaging means at the opposite ends of said body, a gauge connected to one of said wire engaging means and said body, and means cooperating with the other wire engaging means for moving the same towards and away from said body.

7. A tensiometer comprising a rigid body, a fixed fulcrum intermediate the ends thereof and adjustable wire engaging means disposed at the opposite ends of said body at points opposite a central longitudinal line through said body, and means for yieldingly mounting the adjustable wire engaging means at one end of the body.

8. A tensiometer comprising a rigid body, a fixed fulcrum intermediate the ends thereof, wire engaging means at the ends of said body arranged angularly with respect to said fulcrum, and means for adjustably and yieldingly mounting the wire engaging means at one end of said body.

9. A tensiometer comprising a rigid body, a fixed fulcrum intermediate the ends thereof, wire engaging means at the ends of said body, a gauge adjustably mounted on said body, a leaf spring carried by said body and connected with said gauge and one of said wire engaging means, and means on said wire engaging means for adjusting the same with respect to said spring.

In testimony whereof I hereunto affix my signature.

GEORGE ARTHUR ILER.